(12) United States Patent
Daly et al.

(10) Patent No.: US 6,303,934 B1
(45) Date of Patent: Oct. 16, 2001

(54) MONOLITHIC INFRARED SPECTROMETER APPARATUS AND METHODS

(76) Inventors: James T. Daly, 33 Patty's Rd., Mansfield, MA (US) 02408; Andrew Bodkin, 37 Forest St., Needham, MA (US) 02192; Michael J. Groden, 62 Rattlesnake Hill Rd., Auburn, NH (US) 03032; Edward A. Johnson, 41 N. Rd., Suite 103, Bedford, MA (US) 01730

( * ) Notice: Subject to any disclaimer, the term of this patent is extended or adjusted under 35 U.S.C. 154(b) by 0 days.

(21) Appl. No.: 09/058,488

(22) Filed: Apr. 10, 1998

Related U.S. Application Data

(60) Provisional application No. 60/043,884, filed on Apr. 10, 1997.

(51) Int. Cl.[7] ................................................. G01N 21/00
(52) U.S. Cl. .......................................... 250/339.02; 385/31
(58) Field of Search ........................ 250/339.02; 385/31, 385/42, 37, 10, 2

(56) References Cited

U.S. PATENT DOCUMENTS

| | | | |
|---|---|---|---|
| 4,274,706 | * | 6/1981 | Tangonan ................................ 385/37 |
| 4,673,241 | * | 6/1987 | Nishiwaki et al. ....................... 385/2 |
| 5,082,629 | * | 1/1992 | Burgess, Jr. et al. ............... 422/82.11 |
| 5,185,829 | * | 2/1993 | Yamada et al. ......................... 385/37 |
| 5,206,920 | * | 4/1993 | Cremer et al. .......................... 385/37 |
| 5,343,542 | * | 8/1994 | Kash et al. .............................. 385/31 |
| 5,550,373 | | 8/1996 | Cole et al. ........................... 250/338.1 |
| 5,581,639 | * | 12/1996 | Davies et al. ........................... 385/10 |
| 5,615,008 | | 3/1997 | Stachelek .............................. 356/301 |
| 5,734,165 | * | 3/1998 | Unal et al. ........................... 250/338.1 |
| 5,784,507 | | 7/1998 | Holm-Kennedy et al. ............. 385/31 |

* cited by examiner

*Primary Examiner*—Constantine Hannaher
*Assistant Examiner*—Otilia Gabor
(74) *Attorney, Agent, or Firm*—McDermott, Will & Emery

(57) ABSTRACT

A spectrometer system comprises (i) a slab waveguide characterized as an index of refraction higher than a surrounding medium, and having front surface and a rear surface opposite thereto, the front surface including a input portion for accepting optical radiation, a diffractor portion and an exit portion, (ii) a diffraction grating disposed on said diffractor portion of said front surface, (iii) a detector array aligned adjacent to the exit portion, and (iv) a mirror coated on the rear surface of the waveguide. Radiation transmitted within the waveguide from the input portion is reflected and collimated by the mirror to the granting. Light diffracted from the grating is dispersed to the mirror and reflected toward and through the exit portion and onto the array.

10 Claims, 3 Drawing Sheets

MONOLITHIC INFRARED SPECTROMETER APPARATUS AND METHODS

RELATED APPLICATIONS

This application is a continuation application of commonly-owned and copending U.S. application Ser. No. 60/043884 Apr. 10, 1997, which is hereby incorporated by reference.

BACKGROUND

Conventional Ebert and Czerny-Turner type spectrometers and spectrographs are known in the art and have been common optical instruments for most of this century. These instruments use free-space optical elements—mirrors, reflective gratings, and slits—to disperse incident light into component wavelengths. Recently, there has been some experimental work using waveguides made of plastic or silicon dioxide, rather than air, to transmit the light from one optical element to the next.

Most infrared spectrometers and spectrographs of the prior art use cooled infrared detectors as well as separately-aligned optical elements. Cooling the detectors requires added bulk and heavy equipment, such as closed cycle refrigerators, cryogenic liquid, and thermoelectric coolers with large power supplies. Maintaining optical alignment is also a challenge if the instrument is to be subjected to environmental stresses.

Infrared spectroscopy for chemical analysis has typically used laboratory grade spectrometers, spectrographs, or Fourier Transform Infrared (FTIR) instruments. These instruments can be as small as a cigar box and as large as a table top. They generally consist of entrance and exit slits, reflective mirrors and a reflective diffraction grating made of glass which may or may not be rotated to scan the wavelengths of interest. The FTIR, for example, generally uses a Michelson interferometer with a moving mirror in one interferometer leg and a fixed wavelength reference such as a laser to scan the wavelengths. In addition there is a host of external equipment, including power supplies, scan motors and associated control electronics, and of course a cooled infrared detector. For example, an infrared chemical analysis instrument developed by Foster-Miller uses an FTIR about the size of a breadbox with a liquid nitrogen-cooled mercury cadmium telluride (HgCdTe) detector.

There are a few spectrometers, in the prior art, that attempt to remedy the above-described problems of size, weight, complexity and power consumption. Zeiss manufactures a Monolithic Miniature-Spectrometer, or MMS 1, and distributes the MMS 1 through Hellma International, Inc., of Forest Hills, N.Y. The MMS 1 uses a conventional silicon photodiode array and a cylinder of glass with an integral imaging grating. However, its operation is limited by the photodiode and the spectral limitations of the glass relative to ultraviolet (UV) and visible wavelengths. The detector is also positioned away from the waveguide, presenting certain optical alignment difficulties, particularly under environmental stresses.

Another instrument has been demonstrated by researchers at Kernforschungszentrum Karlsruhe GmbH (U.S. representative American Laubscher Corp., Farmingdale, N.Y.). It uses a waveguide and grating fabricated in a multi-layer photoresist of polymethyl methacrylate (PMMA) to couple the output of an optical fiber to a linear detector array or array of fibers. This instrument is designed for demultiplexing applications. As above, because of the choice of materials, operation of this device is limited to visible and near-IR wavelengths of 600 nm to 1300 nm. Specifically, fabrication of the waveguide and grating is done by a process called LIGA (which stands for the German words for Lithography, Galvanoformung and Abformung) which uses a three-layer photoresist and deep-etch X-ray lithography.

Yet another instrument has been developed by researchers at Oak Ridge National Laboratory. It is a microspectrometer based on a modified Czerny-Turner configuration and machined from a block of PMMA also known as Acrylic™ material or Plexiglas™ material. It has a bandwidth of about 1 $\mu$m centered at 980 nm and uses an externally mounted linear photodiode array.

None of these prior art spectrometers permit fully monolithic operation and spectral sensitivity from 1.1 $\mu$m–12 $\mu$m, or further, and with uncooled detectors.

It is, accordingly, an object of the invention to provide apparatus that solves or reduces the above-described problems in the prior art.

Another object of the invention is to provide a hand-held, monolithic, rugged IR spectrometer.

A further object of the invention is to provide methods of manufacturing uncooled IR spectrographs.

Yet another object of the invention is to provide a process of isolating chemical species over a large infrared band with a monolithically-constructed IR spectrometer.

These and other objects will become apparent in the description which follows.

SUMMARY OF THE INVENTION

The spectrograph of the invention overcomes many of the problems in the prior art by using uncooled detectors, e.g., microbolometers, which eliminate the need for associated cooling equipment. Other detectors such as PbSe or PbS are also suitable. In addition, the spectrograph of the invention is monolithically constructed with a single piece of silicon, which eliminates the need for alignment and which makes the device inherently rugged and light weight. The use of standard silicon microelectronics technology also makes the invention low-cost, as compared to the prior art. By way of example, these costs can be orders of magnitude lower than the conventional spectrographs, i.e., hundreds of dollars instead of tens of thousands of dollars.

In one aspect, the invention includes a solid optical grade waveguide (similar to a slab of glass) coupled to a line array of detectors. Light from a source (e.g., earth emissions transmitted through gases) is focussed at a first surface of the waveguide, reflected from an internal mirror to a diffractive surface, which diffracts the light to a second reflector which focusses the light onto the array at a second surface of the waveguide. Accordingly, because of refraction, an f/1 light bundle entering the waveguide is translated to about an f/2 bundle within the waveguide, making it easier to cope with wavefronts therein.

In one aspect, the waveguide is silicon to transmit IR light; and the detector array is one of microbolometers, PbSe, PbS, or other IR sensitive detectors.

In another aspect, the waveguide is transmissive to visible light and the detectors are CCD elements.

In yet another aspect, the waveguide is ZnSe and the detectors are "dual band" so that visible and IR light energy are simultaneously captured at the detectors. For example, each pixel of the dual band detector can include a microbolometer and a CCD element.

The invention has several advantages over the prior art. First, it monolithically integrates all parts of the spectrometer, including the detector, thereby making the instrument compact, rugged and alignment-free. Further, by fabricating the entire device on one piece of silicon, using silicon micromachining technology, we take advantage of the thirty years of silicon process development, and the emergence of silicon as a commodity item, to enable the fabrication of the instrument at a very low cost.

Other capabilities, features and advantages of a spectrometer constructed according to the invention include: (a) the ability to sense and identify chemicals in a variety of applications and environments, (b) the ability to determine chemical concentrations, (c) operation with low-cost, low power, and long-term unattended operation or calibration, (d) uncooled operation, without expensive and unwieldy cooled detector elements, and (e) a rugged, alignment-free instrument.

The invention is next described further in connection with preferred embodiments, and it will become apparent that various additions, subtractions, and modifications can be made by those skilled in the art without departing from the scope of the invention.

DETAILED DESCRIPTION OF THE DRAWINGS

Figure 1:
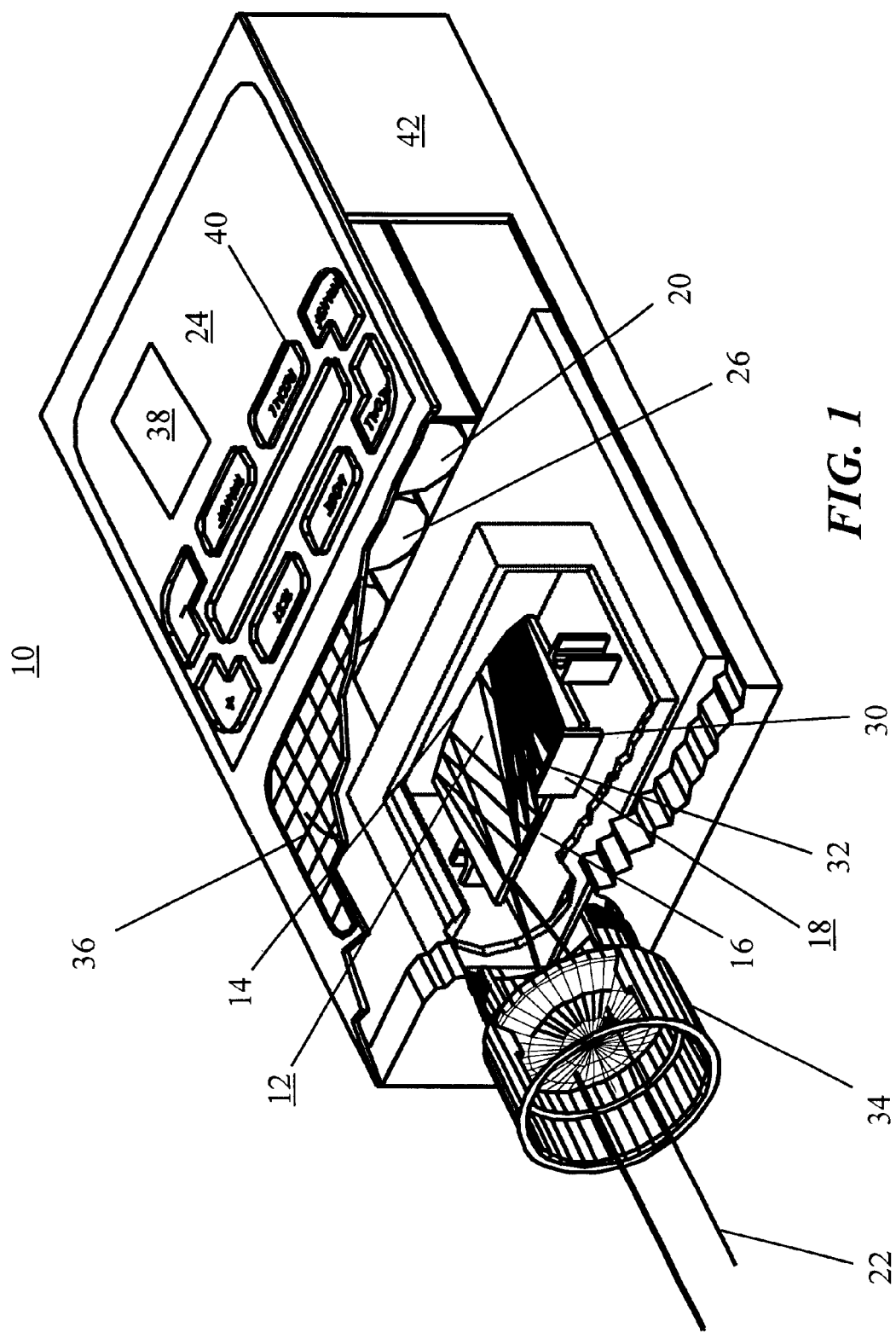
FIG. 1 shows a perspective view of a spectrometer system of the invention.

As shown in FIG. 1, one embodiment of the invention includes a spectrometer system 10 with the following elements: a silicon block waveguide 12, a cylindrical mirror 14 (e.g., gold-coated), a diffraction grating 16 (preferably gold-coated), and a linear detector array 18 (e.g., a microbolometer or microthermopile array). Electronics 20 can couple to the array 14 so as to collect electronic data representative of the spectral characteristics of the light 22 entering the system 10. Control of the system 10 is obtained through user interface 24. A battery 26 can be used to power the system 10.

Figure 2:
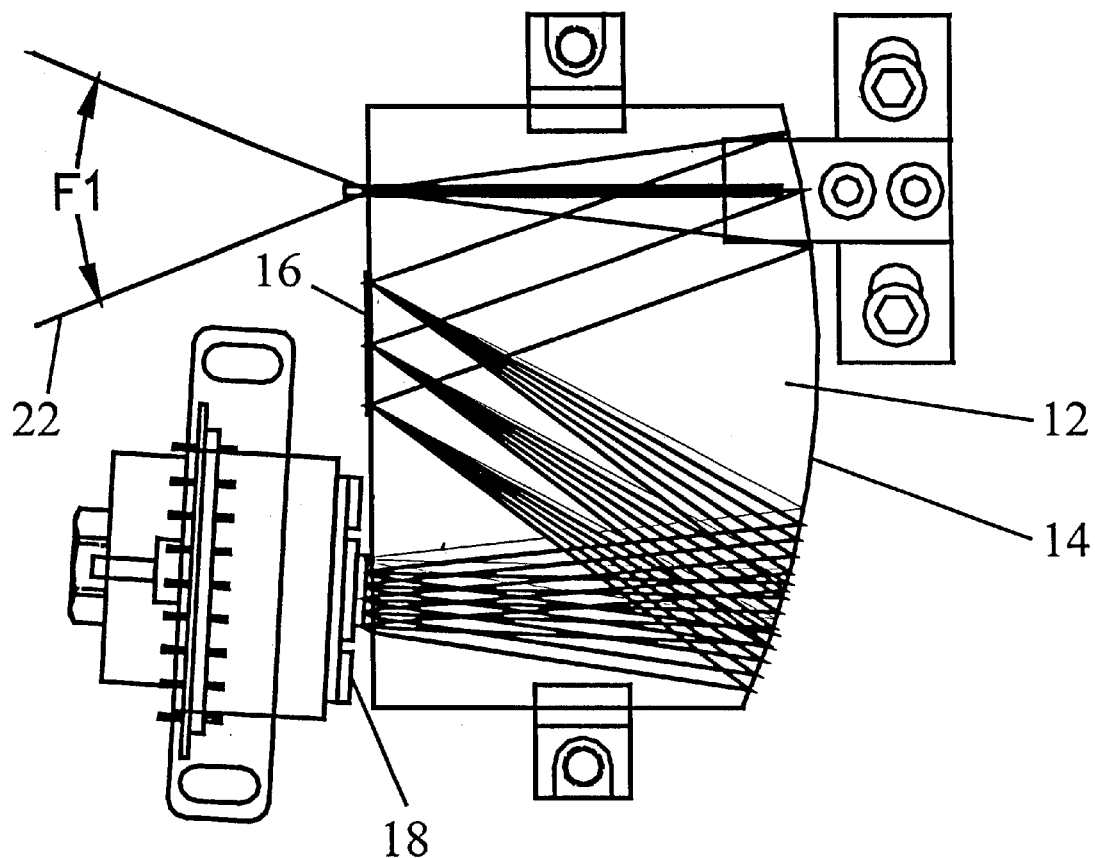
FIG. 2 illustrates optical bench features of the waveguide, optical path, and detector of the system of FIG. 1.

The system of FIGS. 1 and 2 can further include detector preamps 30, a multiplexer 32, input focusing lenses 34, a microprocessor 36, an LCD display 38, keys 40 on the interface 24, and a protective housing 42.

Generally, these elements have the following function, as further described in the attached appendices and in the related provisional application.

1. Silicon Block Waveguide 12

The silicon slab waveguide is the transmitting medium for the light before and after it is dispersed by the grating. Because it is a high index of refraction material (n=3.4), compared to the surrounding environment (n=1), light will be reflected from the polished top, bottom and sides of the waveguide without loss. The silicon block also acts as a fixed dimension frame upon which the grating, mirror, and detector array are fabricated thereby making the instrument compact, rugged, and alignment-free.

2. Reflective Flat Mirror 14

The reflective flat mirror folds the path of the injected light so as to achieve a fiber-to-grating vs. grating-to-detector distance ratio of 2:1 or more. This is important if the input light comes from an infrared fiber with a typical core diameter of 200~m yet we are focusing the light onto a detector array with 50-$\mu$m wide pixels. To focus the light effectively with only one concave surface, fiber-to-grating vs. grating-to-detector distance ratio is directly proportional to the ratio of entrance and exit spot sizes.

3. Reflective Diffraction Grating 16

Figure 3:
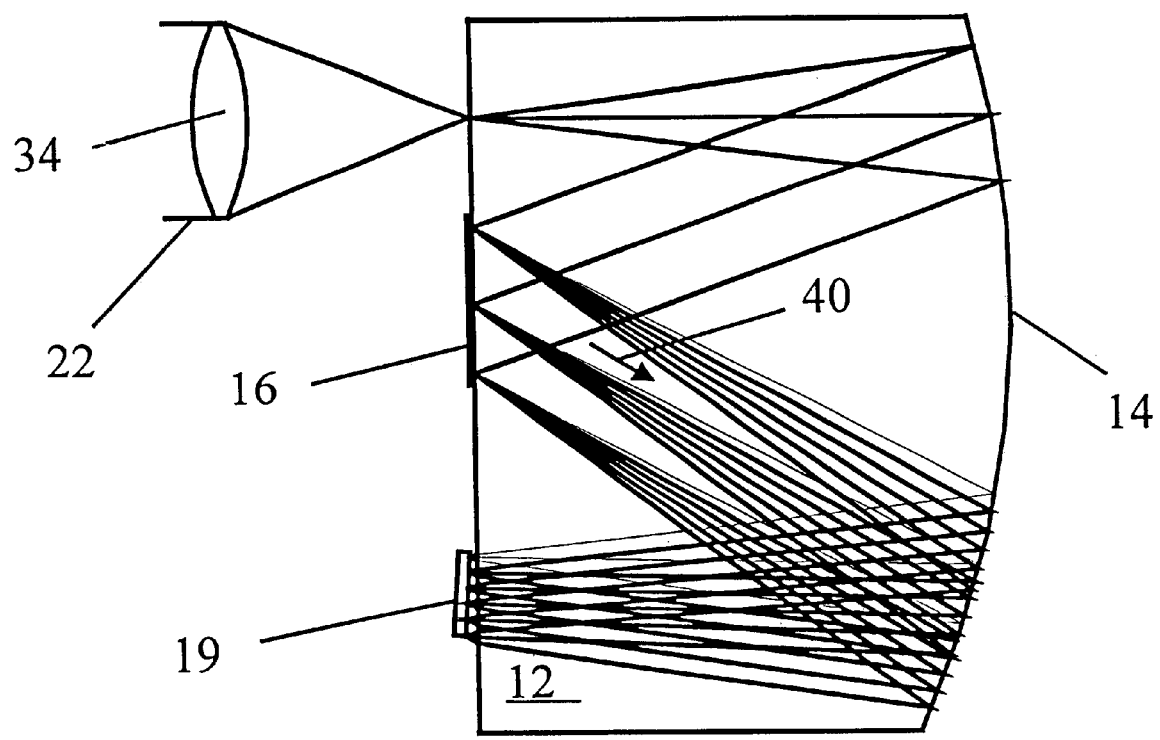
FIG. 3 shows a schematic layout of the optical trace of the system of FIG. 1.

The concave grating disperses the light into its component wavelengths (shown in FIG. 3 as light path 40) and focuses it onto the detector plane 18. In a normal grating with uniform line spacing, each wavelength has a different focal length. Therefore, the focal points for the various wavelengths will lie along the circumference of a circle that includes the grating. This circle is called the Rowland circle and is well-known by those skilled in the art of optics. However chirping the grating, i.e., varying the line spacing, flattens out the focal points for the various wavelengths almost completely.

4. Detector Plane 19"

The detector plane 19" (FIG. 3) is where the linear detector array 18 is located and the point at which the grating 16 focuses all wavelengths.

5. Linear Detector Array 18

The linear detector array 18 converts the dispersed photons into electrical signals for each wavelength.

8. Anti-reflection Coating(s)

Anti-reflection coatings should be used on either or both the input plane and the detector array plane. By suppressing reflection at the interface between high index of refraction silicon and the ambient environment, we ensure that the maximum number of photons are available for detection.

The invention can be used in applications where infrared analysis for chemical identification and concentration measurement is desired, especially in applications which require low cost, expendable sensors; low power sensors; or uncooled sensors. Particular applications may include detection and measurement of hazardous and pollutant gases, polluted water, chemical analysis of core samples, rocket plumes, smokestacks, biologic and chemical warfare agents, etc.

Appendix A shows and describes other features, embodiments, aspects and advantages of the invention.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

What is claimed is:

1. A spectrometer system, comprising:
   a. a slab waveguide characterized by an index of refraction higher than a surrounding medium, and having a front surface and a rear surface opposite thereto, the front surface including a input portion for accepting optical radiation, a diffractor portion and an exit portion;
   b. a diffraction grating disposed on the diffractor portion of the front surface;
   c. a detector array aligned adjacent to the exit portion; and
   d. a mirror coated on the rear surface of the waveguide such that radiation transmitted within the waveguide from the input portion is reflected and collimated by said mirror to the grating, and wherein light diffracted from the grating is dispersed to the mirror and reflected toward and through the exit portion and onto the array.

2. A system according to claim 1, wherein the waveguide comprises silicon.

3. A system according to claim 1, wherein the detector array is selected from the group consisting essentially of microbolometers, PbSe, PbS, and CCD.

4. A system according to claim 1, further comprising input optical assembly for focusing optical radiation onto the input portion.

5. A system according to claim 1, further comprising an electronic subsystem for collecting signals from the array, for processing the signals, and for correlating the signals to reference data so that a chemical species associated with radiation incident on the input portion is determined.

6. A spectrometer comprising:
   a. an optical waveguide characterized by an index of refraction greater than a surrounding medium, said optical waveguide being disposed about a reference plane defined by first and second intersecting axes, said first and second axes being mutually perpendicular,
   said waveguide having a planar top surface and a planar bottom surface, said top surface and said bottom surface being parallel to said reference plane, and
   said waveguide having a lateral surface extending in the direction of a third axis perpendicular to said first and second axes, between said top surface and said bottom surface,
   said lateral surface including a planar front surface perpendicular to said first axis and parallel to said second axis, and including a cylindrical rear surface opposite said front surface and disposed about an axis parallel to said third axis,
   wherein said front surface includes an input portion, a diffractor portion and a detector portion, said input portion, diffractor portion and exit portion being spread apart in the direction of said second axis,
   b. an optical reflector disposed adjacent to said rear surface, said reflector being adopted to reflect incident light in said waveguide,
   c. a diffraction granting disposed on said diffractor portion,
   d. a detector array adjacent to said exit portion and extending in a direction at least in part in the direction of said second axis,
   wherein said rear surface has a selected radius of curvature and spacing from said input portion whereby incident light focused on said input portion propagates in said waveguide to said reflector whereupon said light is reflected toward said diffractor portion, and
   wherein said rear surface has a selected radius of curvature and spacing from said detector portion whereby light propagating from said reflector and incident on said diffractor portion is diffracted and reflected toward said reflector whereupon said light is reflected toward said exit portion and passes therethrough to be incident on said detector.

7. A system according to claim 6, wherein the waveguide comprises silicon.

8. A system according to claim 6, wherein the detector array is selected from the group consisting essentially of microbolometers, PbSe, PbS, and CCD.

9. A system according to claim 6, further comprising input optical assembly for focusing optical radiation onto the input portion.

10. A system according to claim 6, further comprising an electronic subsystem for collecting signals from the array, for processing the signals, and for correlating the signals to reference data so that a chemical species associated with radiation incident on the input portion is determined.

\* \* \* \* \*